Feb. 1, 1966     I. W. EISENBERG     3,232,566

METER MOUNT

Filed June 11, 1964

INVENTOR.
IRWIN W. EISENBERG
BY Lyon & Lyon
ATTORNEYS

United States Patent Office 3,232,566
Patented Feb. 1, 1966

3,232,566
METER MOUNT
Irwin W. Eisenberg, Pasadena, Calif., assignor to Phaostron Instrument and Electronic Corporation, Pasadena, Calif., a corporation of California
Filed June 11, 1964, Ser. No. 374,364
5 Claims. (Cl. 248—27)

This invention relates generally to an improved way of mounting a meter on a panel. More specifically this invention relates to improved meter mount which allows the meter to be quickly attached or removed from a panel and which eliminates the necessity of numerous screws and bolts.

In large electronic systems a large number of meters are frequently required and it is common to mount the meters on large panels forming an array. Where such a large number of meters are used, it is frequently desired to change them either to alter the system or to substitute a new one for a damaged one. A problem which arises in such an instance is to rapidly replace the instrument within a minimum of time and such time is frequently lengthened by having to work in a small area near active electrical circuits.

It is an object therefore of the present invention to provide a meter which can be quickly and easily mounted on a panel in the shortest possible time.

It is a further object of this invention to provide an instrument which can be mounted to a panel without the use of numerous screws or bolts.

Further objects and advantages of this invention will become apparent upon reading the accompanying description together with the drawings in which.

Figure 1:
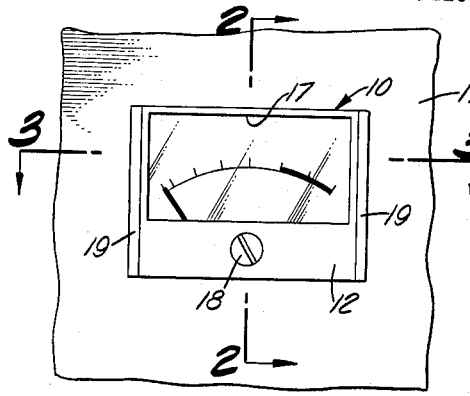
FIGURE 1 is a front elevational view of a meter mounted upon a panel in accordance with this invention.
Figure 2:
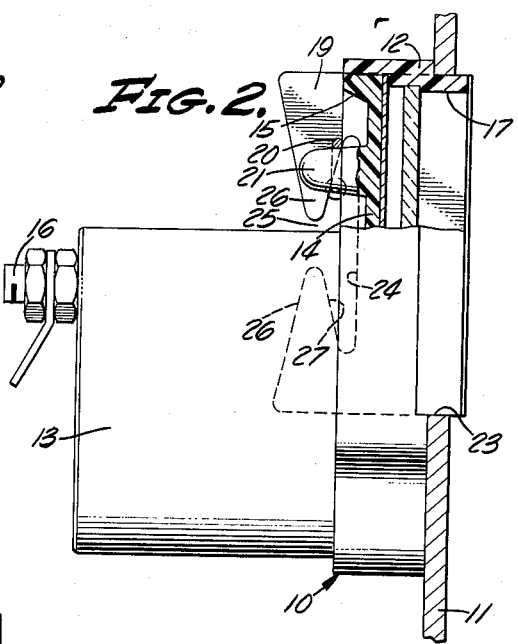
FIGURE 2 is a partial sectional side elevational view taken along line 2—2 of FIGURE 1.
Figure 3:
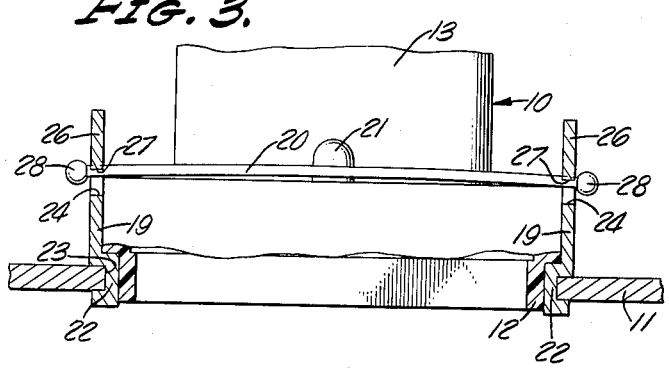
FIGURE 3 is a partial sectional top view taken along line 3—3 of FIGURE 1.
Figure 4:
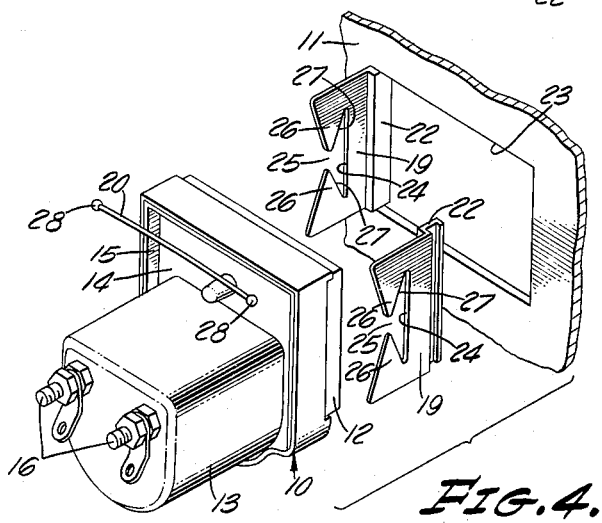
FIGURE 4 is an exploded perspective view showing the various parts of the meter mount.

Referring now to FIGURE 1, a meter generally designated 10 is shown mounted to a panel 11, which could be a part of a larger panel on which other instruments are mounted, or the front panel of a meter case. The housing for meter 10 consists of a front dial housing 12 and a partially cylindrical movement housing 13. Formed integrally with movement housing 13 is the rear dial housing panel 14 having flanges 15 formed about the perimeter thereof such that panel 14 fits tightly into the box shaped front dial housing 12. The rear of movement housing 13 is provided with a number of terminals 16 in the usual manner. The front of dial housing 12 is also provided with a window portion 17 in the usual manner and a zero adjustment screw 18 is likewise provided in housing 12.

Meter 10 is firmly mounted to panel 11 by means of a pair of removable side plates 19, retaining rod 20 and projection 21. The removable side plates 19 each have an offset grooved portion 22 which groove is made to conform to the width of panel 11 so that in position, each groove 22 fits around a side edge of aperture 23 in panel 11. At the rear of each side plate 19 there is a slot 24 having one side open at 25 to form the ears 26. Each of the ears 26 is substantially triangular in shape, having its outer edge slanting inwardly toward the opening 25 and having its inner edge 27 slanting outwardly in the direction of the opening 25.

Figure 5:
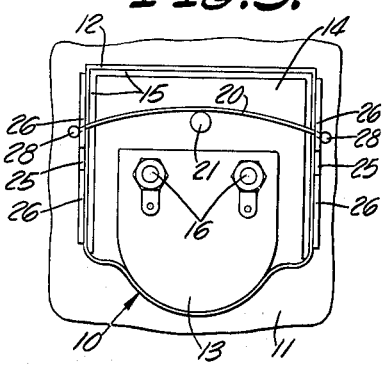
FIGURE 5 is a rear elevational view showing the relationship of the various elements of this invention.

The rearwardly extending projection 21 is formed integrally with the rear dial panel 14, and is vertically offset with respect to a horizontal line drawn between each of the openings 25. See FIGURE 5. The retaining rod 20 maintains the meter 10 in abutting relationship with the panel 11 and side plates 19 when it is inserted in the slots 24 and extended around the offset projection 21. The deformation of retaining rod 20 around the projection 21 performs a two-fold purpose. It not only keeps rod 20 in position, but also exerts a force on the meter case 12 so that it abuts firmly against panel 11. The upward force exerted by the ends of rod 20 as the result of its deformation, is exerted against the slanted sides 27 of the slot 24, which transfers this force to a horizontal one directed rearwardly against side 27 and forwardly against the edge of the housing 12. In order to prevent rod 20 from coming out of the slot 24, keeper balls 28 are placed on each end thereof.

The ease by which a meter can be mounted using the present invention is best demonstrated by the following procedure. The pair of side plates 19 are inserted into the aperture in the panel at each side, then the meter is inserted, then the retaining rod 20 is inserted into each slot 24 and the rod is deformed until it snaps over the projection 21. Removal of the meter is likewise easily affected by merely disengaging the rod 20 from the projection 21 whereupon all of the parts can be easily removed. It is worthy of note that each side plate 19 is substantially a duplicate of the other and therefore can be cheaply manufactured by a single die rather than having a right and left hand plate.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. An assembly for mounting a meter or the like through an aperture in a panel, the combination comprising a meter housing having a projection extending rearwardly therefrom, a pair of removable side plates and a retaining bar; each said side plate removably positioned in said aperture in said panel at opposite sides thereof and contacting an edge of said panel in an overlapping relationship; each of said side plates having a vertical slot in the rear edge thereof, said slot having one side open to receive an end of said retaining bar; said rearwardly extending projection vertically offset with respect to said openings in said slots, said retaining bar having each end thereof inserted in said slots and bearing against an inner edge thereof, the center of said retaining rod being deformed vertically around said projection to maintain said meter housing in abutting relationship with said panel.

2. An assembly for mounting a meter or the like through an aperture in a panel, the combination comprising a meter housing having a projection extending rearwardly therefrom, a pair of removable side plates and a retaining bar; each said side plate removably positioned in said aperture in said panel at opposite sides thereof and contacting an edge of said panel in an overlapping relationship; each of said side plates having a vertical slot in the rear edge thereof, said slot having one side open to receive an end of said retaining bar; said rearwardly extending projection vertically offset with respect to said openings in said slots, said open sides of said slots tapering inwardly, said retaining bar having each end thereof inserted in said slots and bearing against said tapered side, the center of said retaining rod being deformed vertically around said projection to maintain said meter housing in abutting relationship with said panel.

3. An assembly for mounting a meter or the like through an aperture in a panel, the combination comprising a meter housing having a projection extending rearwardly therefrom, a pair of removable side plates and a retaining bar; each said side plate removably positioned in said aperture in said panel at opposite sides thereof and contacting an edge of said panel in an overlapping relationship; each of said side plates having a vertical slot in the rear edge thereof, said slot having one side open to receive an end of said retaining bar; said rearwardly extending projection vertically offset with respect to said openings in said slots, said open sides of said slots tapering inwardly, said retaining bar having each end thereof inserted in said slots and bearing against said tapered side, the center of said retaining rod being deformed vertically around said projection to maintain said meter housing in abutting relationship with said panel, each end of said retaining rod being enlarged to form keeper balls to prevent disengagement of said rod from said slots.

4. An assembly for mounting a meter or the like through an aperture in a panel, the combination comprising a meter housing having a projection extending rearwardly therefrom, a pair of removable side plates and a retaining bar; said side plates having a vertically extending groove adjacent the front edge thereof, each said side plate positioned in said aperture in said panel at opposite sides thereof, each of said grooves receiving an edge of said panel therein; each of said side plates having a vertical slot in the rear edge thereof, said slot having one side open to receive an end of said retaining bar; said rearwardly extending projection vertically offset with respect to said openings in said slots, said open sides of said slots tapering inwardly, said retaining bar having each end thereof inserted in said slots and bearing against said tapered side, the center of said retaining rod being deformed vertically around said projection to maintain said meter housing in abutting relationship with said panel.

5. An assembly for mounting a meter or the like through an aperture in a panel, the combination comprising a meter housing having a projection extending rearwardly therefrom, a pair of removable side plates and a retaining bar; said side plates having a vertically extending groove adjacent the front edge thereof, each said side plate positioned in said aperture in said panel at opposite sides thereof, each of said grooves receiving an edge of said panel therein; each of said side plates having a vertical slot in the rear edge thereof, said slot having one side open to receive an end of said retaining bar; said rearwardly extending projection vertically offset with respect to said openings in said slots, said open sides of said slots tapering inwardly, said retaining bar having each end thereof inserted in said slots and bearing against said tapered side, the center of said retaining rod being deformed vertically around said projection to maintain said meter housing in abutting relationship with said panel, each end of said retaining rod being enlarged to form keeper balls to prevent disengagement of said rod from said slots.

References Cited by the Examiner
UNITED STATES PATENTS

| | | | |
|---|---|---|---|
| 1,622,897 | 3/1927 | Adair | 248—27 |
| 2,751,173 | 6/1956 | Fredriksen | 248—27 |
| 3,025,997 | 3/1962 | Matusky et al. | 220—95 |

FOREIGN PATENTS

| | | |
|---|---|---|
| 961,043 | 3/1957 | Germany. |

CLAUDE A. LE ROY, *Primary Examiner.*